April 14, 1925.

A. E. RHOADES

CLUTCH CONTROLLING MECHANISM

Filed Sept. 16, 1922   2 Sheets-Sheet 1

Inventor.
Alonzo E. Rhoades
by Heard Smith & Tennant
Attys.

April 14, 1925.

A. E. RHOADES

CLUTCH CONTROLLING MECHANISM

Filed Sept. 16, 1922    2 Sheets-Sheet 2

1,533,516

Inventor.
Alonzo E. Rhoades
by Heard Smith & Tennant
Attys.

Patented Apr. 14, 1925.

1,533,516

UNITED STATES PATENT OFFICE.

ALONZO E. RHOADES, OF HOPEDALE, MASSACHUSETTS, ASSIGNOR TO DRAPER CORPORATION, OF HOPEDALE, MASSACHUSETTS, A CORPORATION OF MAINE.

CLUTCH-CONTROLLING MECHANISM.

Application filed September 16, 1922. Serial No. 588,569.

*To all whom it may concern:*

Be it known that I, ALONZO E. RHOADES, a citizen of the United States, and resident of Hopedale, county of Worcester, State of Massachusetts, have invented an Improvement in Clutch-Controlling Mechanisms, of which the following description, in connection with the accompanying drawing, is a specification, like characters on the drawing representing like parts.

This invention relates to improvements in clutch controlling mechanisms for a driving shaft having mounted thereon fast and loose clutch members and the principal object of the invention is to provide means for forcing the loose clutch member into engagement with the fast clutch member with greater force than has been obtained in previous shifting mechanisms.

A further object of the invention is to provide a clutch controlling mechanism in which the force applied to the loose clutch member is exerted in proximity to the shaft and substantially in parallelism with the axis of the shaft.

A further object of the invention is to produce a clutch controlling device of the character described in which the friction of the clutch shifting mechanism will be reduced to a minimum.

More particularly the invention comprises certain improvements in the clutch controlling mechanism for looms of the type disclosed in my prior Patent No. 904,450 granted November 17, 1908, and the object thereof is to provide a construction in which the clutch shifting lever is fulcrumed to swing about an axis perpendicular to the axis of the driving shaft and provided with means adapted to apply force to the hub of the loose clutch member or pulley closely adjacent to said shaft and in a direction substantially parallel with the axis thereof, whereby the clutch members will be forced together with greater pressure, thus enabling the loom to be started more quickly and driven more effectively.

These and other objects and features of the invention will more fully appear from the following description and the accompanying drawings and will be particularly pointed out in the claims.

A preferred embodiment of the invention is illustrated herein as applied to the driving mechanism for actuating the driving or crank shaft of the loom, but it will be obvious that the invention is adapted to be used in connection with other forms of driving mechanism to which it may be applicable.

Inasmuch as the invention relates only to the controlling mechanism for relatively moving the fast and loose clutch members of the driving mechanism of a loom, only so much of the loom is shown in the accompanying drawings as is necessary to illustrate the application of the invention thereto.

Figure 1:
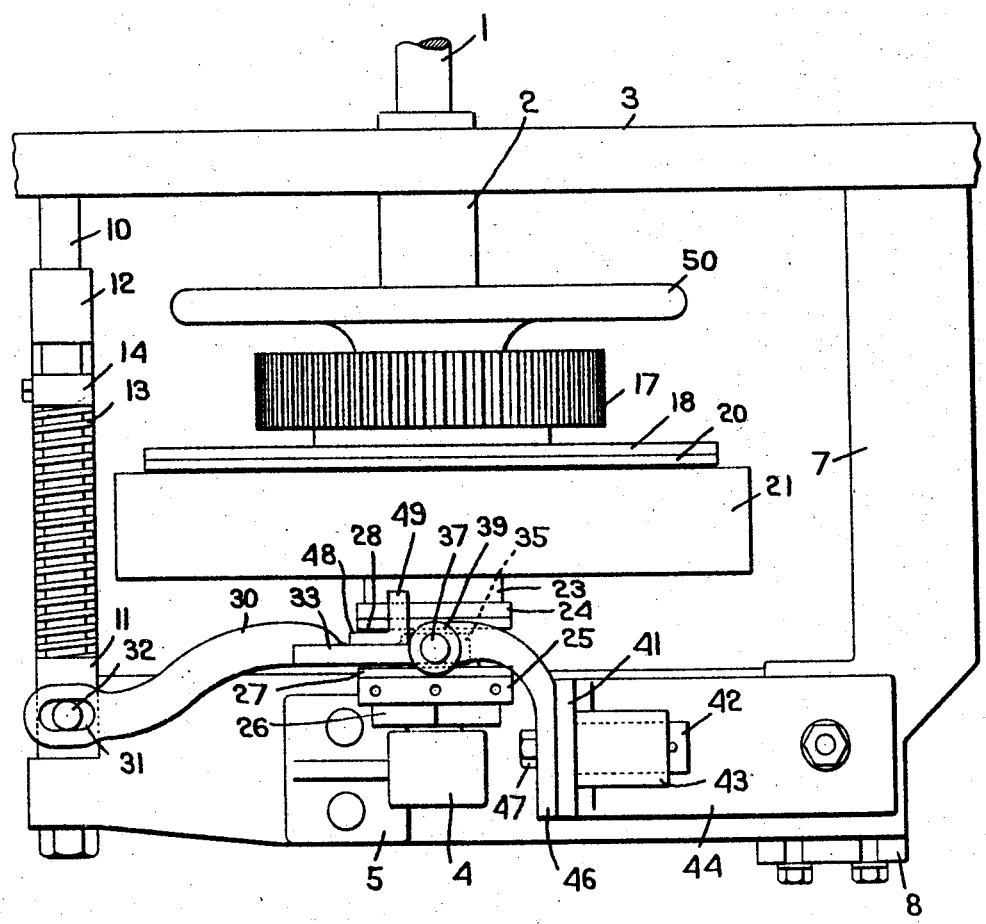
Fig. 1 is a plan view showing the loom side, the driving or crank shaft mounted therein, the driving and controlling mechanism for the crank shaft and the frame which supports the end of the driving shaft and controlling mechanism.

The invention is illustrated herein as applied to a loom in which the driving or crank shaft 1 is mounted in a suitable bearing in a box 2 upon the loom side 3 and is supported at its end in a bearing 4 carried by a bracket 5 mounted upon the transverse member 6 of a supplemental frame having a longitudinal member 7 connected to the loom side and supported upon legs 8 and 9. The supplemental frame also includes a tie rod 10 upon which the usual yoke for actuating the controller for the clutch mechanism is slidably mounted. This mechanism may be and is similar to that disclosed in my prior Patent No. 904,450 aforesaid, the ends 11 and 12 of the yoke member, which are connected to and operated by the knock-off mechanism of the loom, being slidably mounted upon the tie rod 10 and normally acted upon by a helical spring 13 encircling the tie rod 10 and abutting against the member 11 and a fixed abutment 14 in such a manner as to tend to throw the clutch members out of engagement upon actuation of the knock-off mechanism as is usual in loom construction.

In the present invention a fast clutch member is secured to the driving shaft and a loose clutch member rotatably mounted upon the driving shaft, said members being provided with frictional faces adapted to be forced into engagement by longitudinal movement of the loose clutch member upon the shaft and a controller is provided which is so constructed as to apply the force for shifting the loose clutch member along the shaft in close proximity to the shaft and in a direction substantially in parallelism with the axis of the shaft.

In the particular construction illustrated herein a sleeve 15 is secured to the shaft by a suitable key 16 and has mounted upon it the usual gear 17 which actuates the cam shaft of the loom, and a clutch member or disk 18 fixedly secured to the gear 17.

A convenient means which is illustrated herein for securing the gear 17 to the sleeve 15 consists in providing a plurality of screws 19 which are threaded into complementary groove seats respectively in the outer periphery of the end portion of the sleeve and the inner periphery of the aperture in the gear 17, which fits upon the sleeve.

The clutch member or disk 18 desirably is provided with a frictional face 20 of leather or other composition. The loose clutch member is illustrated herein as comprising a driving pulley 21 having a clutch face 22 complementary to the face of the clutch member 18 and a hub 23 having a flat end and provided with an annular end flange 24, the loose clutch member or pulley being rotatably and slidably mounted upon the sleeve 15.

The present invention consists broadly in providing a controller for shifting the loose clutch member or pulley longitudinally of the shaft by means of which the force is applied to the hub of the loose clutch member or pulley in proximity to the shaft and in substantial parallelism with the axis of the shaft. The controller desirably is fulcrumed to swing about an axis perpendicular to the axis of the driving shaft and is provided with an actuating member, or preferably actuating members, which, when the controller is swung, act respectively upon the end of the hub of the loose clutch member and an abutment which is fixed against relative movement longitudinally of the shaft. This abutment may be supported upon a stationary portion of the frame, but desirably is mounted upon the sleeve as illustrated herein.

Figure 4:
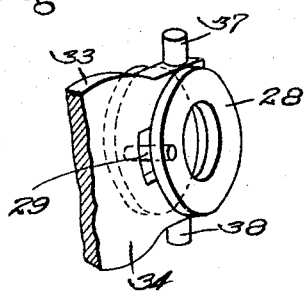
Fig. 4 is a detail view of the anti-friction rings and the pin connecting them, and also showing the bifurcated end of the controller lever, the arms of which are adapted to engage the pin and prevent rotation of the anti-friction rings.
Figure 2:
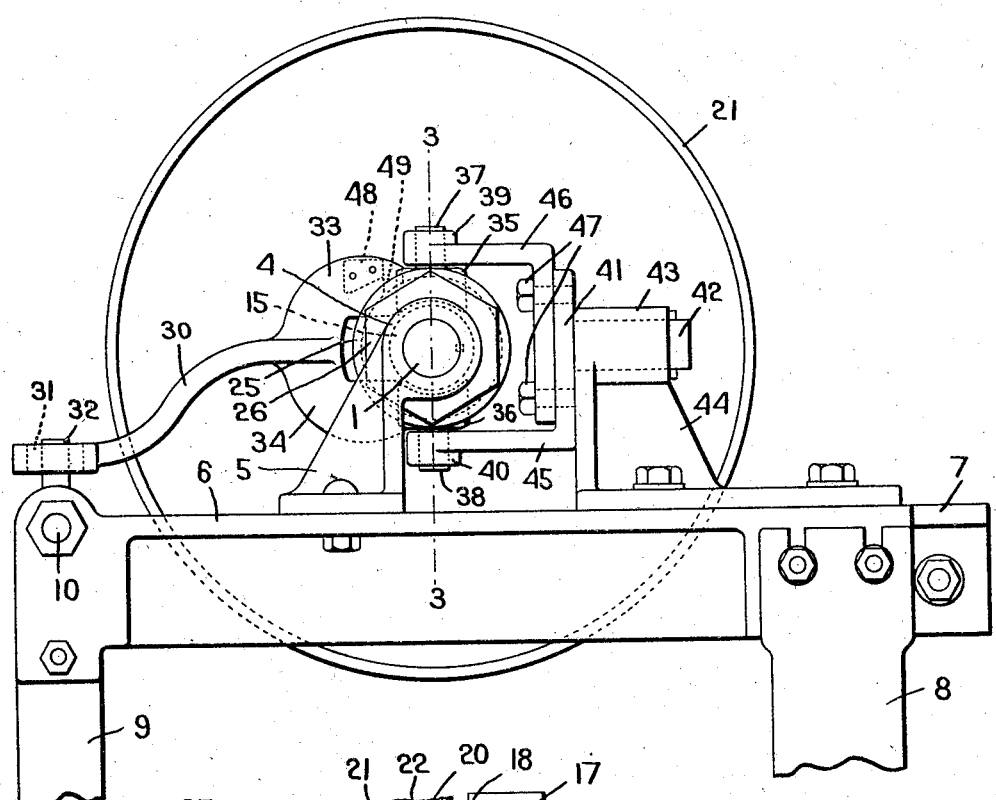
Fig. 2 is an end elevation of the same.
Figure 3:
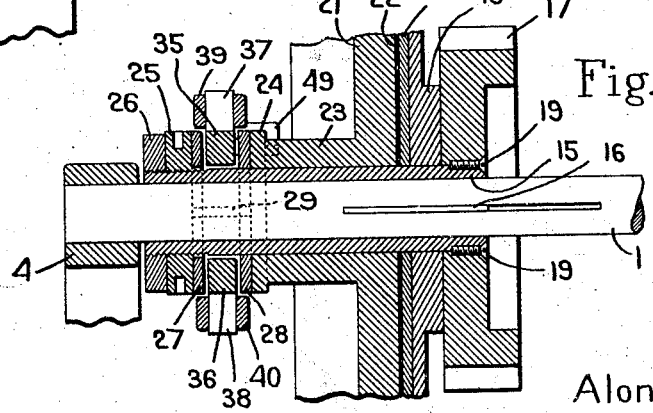
Fig. 3 is a detail vertical sectional view on line 3—3 Fig. 2.

In the preferred embodiment of the invention disclosed herein the abutment is in the form of a ring 25 provided with suitable spanner sockets and screwed upon the end portion of the sleeve 15 and retained in adjusted position thereon by a lock nut 26. Desirably anti-friction rings 27 and 28 are located respectively adjacent the abutment and the end of the hub 23 of the loose clutch member or pulley. These anti-friction rings are connected by a pin or rod 29 as illustrated in Fig. 4 in such a manner that the rings can slide lengthwise upon the rod. The rod 29 is located between the arms of the controller lever so that the rotation of the rings about the shaft is prevented by engagement of the pin with one of the arms of the controller lever.

The controller for actuating the loose clutch member comprises a lever 30, the outer end of which is provided with a slot 31 which embraces a stud 32 upon the member 11 of the yoke which is actuated by the knock-off mechanism of the loom.

The controller lever 30, as illustrated herein, comprises an offset body portion having relatively narrow but broad end portions 33 and 34 which form a yoke extending across the sleeve 15 upon diametrically opposite sides thereof and having at its ends relatively thick substantially rectangular winged portions or actuators 35 and 36 which are located between the rings 27 and 28 upon the sleeve 15 and partially embrace the sleeve. The members 35 and 36 of the controller lever, which are thus located between the rings 27 and 28, are provided with fulcrum trunnions 37 and 38, the axes of which are perpendicular to the axis of the driving shaft 1. The trunnions 37 and 38 are mounted respectively in bosses 39 and 40 in a yoke-like carrier 41 which is provided with a pivotal stud 42 which is journalled in a suitable bearing 43 in a bracket 44 which is secured to the horizontal portion 6 of the supplemental frame.

Desirably the yoke members of the carrier are made in two sections to enable the mechanism to be assembled. In the construction shown herein the lower yoke member 45 of the carrier is of L-shape and is integral with the pivotal stud 42, while the other yoke member 46 is likewise of L-shape and is connected to the yoke member 45 by suitable bolts 47.

The axis of the pivotal stud of the carrier is perpendicular to the axis of the shaft 1 and is also perpendicular to the axes of the trunnions 37 and 38 upon which the controller is fulcrumed.

By reason of this construction the lateral or swinging movement of the controller lever 30 upon its fulcrumed trunnions 37 and 38 causes the members 35 and 36 of the controller, which are defined herein as actuators, to press at the end of one side against the ring 27 which engages the abutment 25, and at the end of the other side against the ring 28 which engages the end of the hub 23 of the loose pulley, thus forcing the loose clutch member or pulley longitudinally of the sleeve and causing its face to engage the friction disk 20 upon the fast clutch member.

It will be noted that force is applied by the actuators upon the abutment and upon the end of the hub of the loose clutch member in proximity to the driving shaft and in opposite directions substantially parallel with the axis of the driving shaft. Inasmuch as the actuators are very short in comparison with the length of the controller lever a powerful force is exerted upon the end of the hub of the loose clutch member or pulley which serves to force the face of the clutch member firmly into engagement with the friction disk upon the fast clutch member, thus causing a quick and powerful engagement which will immediately start the loom and substantially prevent slippage of the clutch members when the loom is in operation, notwithstanding the weight and resistance of the loom mechanisms which are actuated thereby.

The pivotal support of the carrier in which the trunnions of the controller are fulcrumed permits an automatic adjustment of the actuators which will cause equal forces to be exerted upon diametrically opposite sides of the hub of the loose pulley and also serves to prevent any binding of the parts of the controlling mechanism.

In order to separate the clutch members a member or plate 48 is secured to the broad portion 33 of the controller and is provided with an L-shaped extension 49 which extends over and engages the opposite face of the flange 24 upon the hub of the loose clutch member or pulley so that when the controller is swung in the opposite direction the loose clutch member will be pulled away from the friction disk 20 of the fast clutch member. The usual hand wheel 50 may be secured to the gear 17 or to the crank shaft as illustrated in Fig. 1 to enable the loom to be turned over manually.

Inasmuch as the clutch members and the abutment upon which the actuators act to force the movable clutch member into and out of engagement with the fixed clutch member are mounted upon the sleeve 15, end-wise thrust upon the shaft is avoided and the consequent friction of thrust bearings eliminated. Furthermore, the present invention when applied to the crank shaft of a loom, for which it is primarily designed, prevents displacement of the cranks relatively to the mechanisms which are operated thereby and thus insures a more perfect operation of such mechanisms.

It will be understood that the embodiment of the invention disclosed herein is illustrative and not restrictive and that various modifications in form, construction and arrangement of parts may be made within the spirit and scope of the following claims and also that the invention may be applied to the driving mechanism of other machines as previously stated herein.

Having thus described my invention, what I claim as new, and desire to secure by Letters Patent, is:

1. A clutch controlling mechanism for a driving shaft having fast and loose clutch members mounted thereon comprising an abutment carried by said shaft and fixed against longitudinal movement relatively to said shaft, a carrier pivotally mounted at one side of said shaft to swing about an axis perpendicular to the axis of said shaft, a controller extending from the other side of said shaft fulcrumed upon said carrier to swing about an axis perpendicular to said shaft and provided with a bifurcated end embracing said shaft and having integral actuating members interposed between said abutment and said loose clutch member upon diametrically opposite sides of said shaft operable when swung about said fulcrum to exert force upon said abutment and said loose clutch member adjacent to said shaft and in opposite directions in lines substantially parallel to the axis thereof and acting to force said loose clutch member into engagement with said fast clutch member.

2. A clutch controlling mechanism for a driving shaft having fast and loose clutch members mounted thereon comprising an abutment carried by said shaft and fixed against longitudinal movement relatively to said shaft, a carrier pivotally mounted to swing about an axis perpendicular to the axis of said shaft and provided with separable yoke members, a controller fulcrumed in said yoke members to swing about an axis perpendicular to said shaft and provided with integral actuating members interposed between said abutment and said loose clutch member operable when swung about said fulcrum to exert force upon said abutment and said loose clutch member to force said loose clutch member into engagement with said fast clutch member.

3. In a loom comprising a frame, a driving shaft, a sleeve secured to said driving shaft having fast and loose clutch members mounted thereon, an abutment ring secured to said sleeve a short distance from the end of the hub of said loose clutch member, a carrier pivotally mounted in a bracket on said loom frame having separable yoke members, a controller fulcrumed in said yoke members to swing about an axis perpendicular to the axis of said shaft and having integral actuators, located upon diametrically opposite sides of said shaft and adjacent thereto, interposed between said abutment and the end of said loose clutch member operable when swung about said fulcrum to force said loose clutch member into engagement with said fast clutch member.

4. In a loom comprising a frame, a driving shaft, a sleeve secured to said driving shaft having fast and loose clutch members mounted thereon, an abutment ring adjustably secured to said sleeve a short distance from the end of the hub of said loose clutch member, a pair of anti-friction rings engaging respectively said abutment and the end of the hub of the loose clutch member mounted on said sleeve, a carrier pivotally mounted upon a bracket on said loom frame having yoke members extending on opposite sides of said shaft, a controller fulcrumed in said yoke members to swing about an axis perpendicular to the axis of said shaft and having arms provided with actuators, located upon diametrically opposite sides of said shaft and adjacent thereto, and interposed between said anti-friction rings operable when swung about said fulcrum to force said loose clutch member into engagement with said fast clutch member and means connecting said anti-friction rings positioned between said controller arms to prevent rotation of said rings while permitting relative movement of said rings in the direction of the axis of the driving shaft.

In testimony whereof, I have signed my name to this specification.

ALONZO E. RHOADES.